United States Patent
Maeda et al.

(10) Patent No.: US 8,808,611 B2
(45) Date of Patent: Aug. 19, 2014

(54) METHOD OF PRODUCING BIAXIALLY STRETCHED POLYESTER BOTTLES

(75) Inventors: Kouji Maeda, Yokohama (JP); Kazuhiro Toyama, Yokohama (JP); Takuya Fujikawa, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 157 days.

(21) Appl. No.: 12/898,575

(22) Filed: Oct. 5, 2010

(65) Prior Publication Data

US 2011/0037204 A1    Feb. 17, 2011

Related U.S. Application Data

(63) Continuation of application No. 12/159,060, filed as application No. PCT/JP2006/301266 on Jan. 20, 2006, now abandoned.

(51) Int. Cl.
*B29C 49/16* (2006.01)
*B29C 49/12* (2006.01)

(52) U.S. Cl.
USPC ............................... 264/529; 264/532

(58) Field of Classification Search
None
See application file for complete search history.

(56) References Cited

U.S. PATENT DOCUMENTS

| | | | |
|---|---|---|---|
| 4,128,383 A | 12/1978 | Bond et al. | |
| 4,151,250 A | 4/1979 | Barry et al. | |
| 4,357,288 A * | 11/1982 | Oas et al. | 264/40.6 |
| 5,290,506 A | 3/1994 | Yokobayashi | |
| 5,658,627 A * | 8/1997 | Fujimaki et al. | 428/36.92 |
| 6,168,749 B1 | 1/2001 | Koch | |
| 6,349,838 B1 * | 2/2002 | Saito et al. | 215/371 |

FOREIGN PATENT DOCUMENTS

| | | |
|---|---|---|
| JP | 52-033956 A | 3/1977 |
| JP | 58-56828 A | 4/1983 |
| JP | 59-184628 A | 10/1984 |
| JP | 07-257534 A | 10/1995 |
| JP | 8-142175 A | 6/1996 |
| JP | 2001-122237 A | 5/2001 |
| JP | 2003-191319 A | 7/2003 |

* cited by examiner

*Primary Examiner* — Monica Huson
(74) *Attorney, Agent, or Firm* — Sughrue Mion, PLLC

(57) ABSTRACT

In effecting the stretching by using a stretch rod in a method of producing a biaxially stretched polyester bottle, the air is blown into the preform at such a flow rate that the preform does not come in contact with the stretch rod but the end thereof and does not come in contact with the surfaces of the mold, either. There can be produced a biaxially stretched polyester bottle having an average thickness of about 0.05 to about 0.2 mm or having a further decreased thickness using a resin in decreased amounts and having a decreased weight without developing burst or whitening caused by over-stretching, without forming ring-like thick portion yet maintaining a good yield and efficiency.

9 Claims, 4 Drawing Sheets

METHOD OF PRODUCING BIAXIALLY STRETCHED POLYESTER BOTTLES

CROSS-REFERENCE TO RELATED APPLICATIONS

This application is a Rule 53(b) Continuation of U.S. patent application Ser. No. 12/159,060 filed Jun. 24, 2008, which is a 371 of PCT Application No. PCT/JP2006/301266 filed Jan. 20, 2006. The above-noted applications are incorporated herein by reference in their entirety.

TECHNICAL FIELD

The present invention relates to a method of producing biaxially stretched polyester bottles. More specifically, the invention relates to a method of producing biaxially stretched polyester bottles, which is capable of forming thin polyester bottles preventing burst and suppressing the formation of ring-like thick portions maintaining good productivity.

BACKGROUND ART

Biaxially stretched polyester bottles have heretofore been known being obtained by biaxially stretch-blow-forming the performs made of a polyester resin such as a polyethylene terephthalate, and have been widely used as containers for containing a variety of kinds of beverages, foods, liquid detergents and the like owing to their excellent transparency, surface luster, shock resistance and gas barrier property.

Biaxially stretched polyester bottles used for containing beverages, usually, have an average thickness of about 0.25 to 0.30 mm. From the standpoint of lowering the cost and decreasing the weight, however, it has been urged to further decrease the amount of the resin that is used.

From the above viewpoint, JP-A-7-257534 proposes a bottle-like container obtained by blow-forming which is so effected that the average thickness of the body wall is not larger than 0.25 mm and the average stretching ratio is not smaller than 10 times.

The weight of the bottle-like containers can be decreased when they have capacities as great as, for example, 5000 mL. However, it becomes difficult to decrease the weight when the containers have capacities which are as relatively small as 2000 mL or less. In the method of producing the bottle-like containers, further, the average stretching ratio is set to be not smaller than 10 times in the biaxial stretch-blow molding but the longitudinal stretching ratio is in a range of 2 to 2.7 times in a customary manner. If it is attempted to further increase the longitudinal stretching ratio, there occur such problems as whitening due to over-stretching, exfoliation of the layers (delamination) and rupture (burst), etc. So, there comes a problem of molding difficulty.

Further, JP-A-2001-122237 discloses a small-thickness bottle capable of decreasing the weight by decreasing the thickness of part of the container. According to this prior art, the average thickness of the shoulder portion of a bottle of about 500 mL is selected to be 0.2 to 0.3 mm, the average thickness of the body wall is selected to be 0.02 to 0.05 mm, and a transverse rib is formed on the body wall to enhance the strength against the deformation. However, when a bottle having such a large change in the thickness is to be stretch-blow-formed, problems arouse in that the thickness must have been varied in advance when the preform is to be injection-formed and difficulty is in involved in setting the conditions for stretch-blow-forming the preform.

JP-A-2003-191319 proposed by the present inventors discloses a biaxially stretch-blown polyester bottle having an average thickness which is decreased down to 0.1 to 0.2 mm. According to this prior art, a self-standing small-thickness bottle-like container is formed without whitening that is caused by over-stretching, making it possible to decrease the amount of the resin that is used and, hence, to decrease the weight.

However, when the stretch-blow forming is to be effected relying on the production methods described in the above prior arts, there often occurs the burst in the initial stage of blow-forming or a ring-like thick portion is formed if the burst does not occur leaving room for improving the yield of the products.

That is, in the stretch-blow molding employed by the above prior arts, the preform is stretched in the longitudinal direction by a stretching rod prior to blowing the air as shown in FIG. 1(B). It therefore becomes probable that the preform comes in contact with the stretching rod. Besides, as shown in FIG. 1(C), when the preform is forcibly stretched in a state where it can be little stretched since its temperature has dropped upon coming in contact with the surface of the mold on the way of being stretched, there occurs the burst or a parting line is formed, which, then, becomes a cause of burst. Further, even when there does not occur the burst, there occurs a problem in that a portion where the temperature has dropped remains as a ring-like thick portion.

DISCLOSURE OF THE INVENTION

It is therefore an object of the present invention to provide a method of producing a biaxially stretched polyester bottle having an average thickness of about 0.05 to about 0.2 mm like the one as obtained by the above prior art proposed by the present inventors or having a further decreased thickness, using a resin in decreased amounts and having a decreased weight, without whitening caused by over-stretching, without developing burst during the blow-forming or without forming a ring-like thick portion in the finally formed article, yet maintaining good yield and efficiency.

According to the present invention, there is provided a method of producing a biaxially stretched polyester bottle by stretching a polyester preform heated at a stretching temperature by using a stretch rod and by blowing the air, wherein, in effecting the stretching by using the stretch rod, the air is blown into the preform at such a flow rate that the preform does not at least come in contact with the stretch rod but the end thereof and does not come in contact with the surfaces of the mold, either.

In the method of producing a biaxially stretched polyester bottle of the present invention, it is desired that:

1. In effecting the stretching by using the stretch rod, the air is blown as a pre-blow, the pre-blow is discontinued simultaneously with the end of stretching that uses the stretch rod and, thereafter, the stretching is effected by a main blow;
2. The stretching by the main blow works to stretch, in substantially the circumferential direction, the preform that has been stretched in the longitudinal direction by the stretching by using the stretch rod;
3. The pre-blow is for blowing 10 to 50% of the volume of the biaxially stretched bottle;
4. The pre-blow blows the air of a pressure adjusted to 0.05 to 0.5 MPa;
5. The pre-blow blows the air of a temperature adjusted to 70 to 250° C.;
6. The temperature for stretching the preform is in a range of 100 to 130° C. on the outer surface of the preform, and a temperature difference between the outer surface of the preform and the inner surface thereof is not larger than 2° C.;

7. The main blow uses the air of a pressure adjusted to 0.5 to 4.0 MPa;

8. The main blow uses the air of a temperature adjusted to 70 to 250° C.;

9. The stretch rod stretches the preform in the vertical direction to not less than 70% of the final size of the bottle; 10. In effecting the stretching by using the stretch rod, a maximum speed of the stretch rod is not greater than 500 mm/sec.;

11. In effecting the stretching by using the stretch rod, the speed of the end of the stretch rod when it comes in contact with the inner surface of the bottom of the preform is not greater than 200 mm/sec.; and 12. The stretching ratios are such that the longitudinal stretching ratio is not smaller than 2.7 times and the area ratio is 12 to 25 times.

In effecting the stretching by using the stretch rod in the method of producing a biaxially stretched polyester bottle, an important feature resides in that the air is blown into the preform at such a flow rate that the preform does not come in contact with stretch rod but the end thereof and does not come in contact with the surfaces of the mold. This makes it possible to form a thin biaxially stretched polyester bottle without causing the burst or without forming a ring-like thick portion and maintaining a good yield.

In the conventional stretch-blow forming which effects the stretching by blowing the air after the stretching has been effected by using the stretch rod as shown in FIG. 1(B), the preform which is being stretched comes in contact with the surface of the mold before it is fully stretched in the longitudinal direction, and the temperature of the preform drops. Therefore, a portion of the preform that is in contact and cannot be easily stretched is forcibly stretched giving rise to the occurrence of a burst or the formation of a parting line which acts like a cutter onto the preform to cause a burst. Further, even when the stretching is short of causing a burst, a portion that is in contact with the surface of the mold exhibits poor stretchability and cannot be fully stretched causing a ring-like thick portion to be formed.

According to the production method of the present invention as shown in FIG. 2(B), on the other hand, the air has been blown to such an extent that the preform does not come in contact with the stretch rod (except an end thereof) and does not come in contact with the surfaces of the mold, either, at the time of stretching by using the stretch rod. Therefore, there is no drop in the temperature of the preform which, therefore, can be entirely stretched uniformly and sufficiently in the longitudinal direction (axial direction) by using the stretch rod as shown in FIG. 2(C) in a state where the preform can be easily stretched since it has been heated.

According to the present invention, even after the stretching by using the stretch rod shown in FIG. 2(C) is discontinued, the stretching is continued without varying the rate of blowing the air to effect the stretching in substantially the circumferential direction, too, making it possible to stretch the preform up to the size of the finally formed article shown in FIG. 2(D). In order to improve the productivity, however, it is desired that the air is blown as a pre-blow when the stretching is to be effected, the pre-blow is discontinued simultaneously with the end of stretching by using the stretch rod and, thereafter, the stretching is effected relying upon a main blow by blowing the air at a flow rate greater than that of the pre-blow. According to this method, the preform that is sufficiently stretched in the longitudinal direction by using the stretch rod is further stretched efficiently in the circumferential direction relying upon the main blow, making it possible to produce a biaxially stretched polyester bottle having a reduced thickness maintaining a good productivity by shortening the stretching time.

BEST MODE FOR CARRYING OUT THE INVENTION

Step of Forming a Preform

Figure 1:
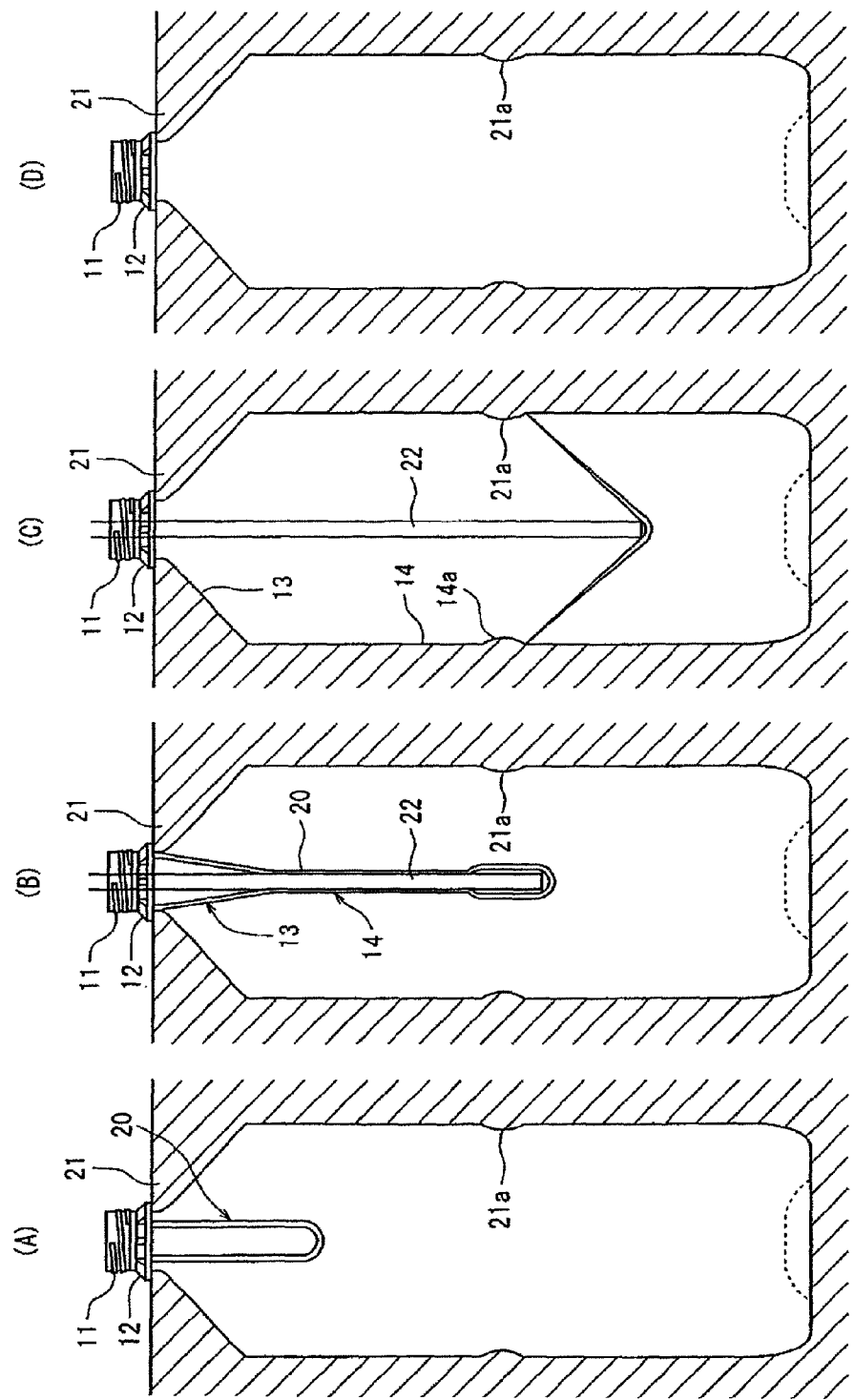
FIG. 1 is a view illustrating a conventional stretch-blow forming of a biaxially stretched polyester bottle.

A preform used for the production method of the present invention may be a known preform used for forming a biaxially stretched polyester bottle.

The polyester resin used here may be a known polyester resin that has heretofore been used for the biaxial stretch-blow forming.

It is desired that a dicarboxylic acid component that constitutes the polyester resin is the one in which not less than 50% and, particularly, 80% of the dicarboxylic acid component is a terephthalic acid from the standpoint of mechanical properties and thermal properties, but may be a caboxylic acid component other than the terephthalic acid, as a matter of course. As the carboxylic acid component other than the terephthalic acid, there can be exemplified isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodium sulphoisophthalic acid, hexahydroterephthalic acid, adipic acid, and sebacic acid.

It is, on the other hand, desired that the diol component is the one in which not less than 50% and, particularly, not less than 80% is an ethylene glycol from the standpoint of mechanical properties and thermal properties. As the diol component other than the ethylene glycol, there can be exemplified 1,4-butanediol, propylene glycol, neopentyl glycol, 1,6-hexylene glycol, diethylene glycol, triethylene glycol, cyclohexane dimethanol, ethylene oxide adduct of bisphenol A, glycerol and trimethylolpropane.

The diol component may further include trimellitic acid, pyromellitic acid, hemimellitic acid, 1,1,2,2-ethanetetracarboxylic acid, 1,1,2-ethanetricarboxylic acid, 1,3,5-pentanetricarboxylic acid, 1,2,3,4-cyclopentanetetracarboxylic acid, biphenyl-3,4,3',4'-tetracarboxylic acid, as well as trifunctional or more highly functional polybasic acids and polyhydric alcohols, such as pentaerythritol, glycerol, trimethylolpropane, 1,2,6-hexanetriol, sorbitol and 1,1,4,4-tetrakis(hydroxymethyl)cyclohexane.

Further, the polyester resin may be blended with known blending agents for resins, such as a coloring agent, antioxidizing agent, a stabilizer, various antistatic agents, a parting agent, a lubricant and a nucleating agent in amounts which do not impair the quality of the finally formed article.

The preform used in the present invention can be formed by a widely known method, such as injection forming or compression forming. The preform that is formed is, as required, heated at the mouth portion so as to be thermally crystallized.

The preform that is used in the invention may have a single-layer structure of the above-mentioned polyester resin, or may have a multi-layer structure using the above polyester resin as the inner and outer layers, and using, as an intermediate layer, any other thermoplastic resin or a widely known functional resin composition having such functions as gas-barrier property, oxygen-absorbing property or oxygen-absorbing/gas-barrier property.

(Step of Heating the Preform)

The preform that is formed is heated at a stretching temperature prior to being subjected to the stretch-blow forming. In the present invention, however, it is desired that the preform is so heated that the temperature on the outer surface of the preform is in a range of 100 to 130° C. and, particularly, 115 to 125° C., and that the temperature difference between the outer surface and the inner surface of the preform is not larger than 2° C. When the temperature on the outer surface of the preform is not lower than 130° C., the preform is whitened due to thermal crystallization, which is not desirable. With the preform being uniformly heated in the direction of thickness maintaining a temperature difference of not larger than 2° C. between the inner surface and the outer surface of the preform, the thermal stress generated at the time of stretching can be nearly uniformed on the inner and outer surfaces, and the preform can be uniformly stretched effectively preventing whitening caused by over-stretching and burst caused by abnormal shrinking. As a result, the biaxially stretched polyester bottle having a further decreased thickness can be formed maintaining a good yield.

The preform can be heated in a customary manner. Generally, the preform of normal temperature is mainly heated by an infrared-ray heater in combination with an inner surface heater, and is heated to lie in the above-mentioned temperature range at the time of blow-forming by taking into consideration the cooling of the preform when it is conveyed.

Figure 3:
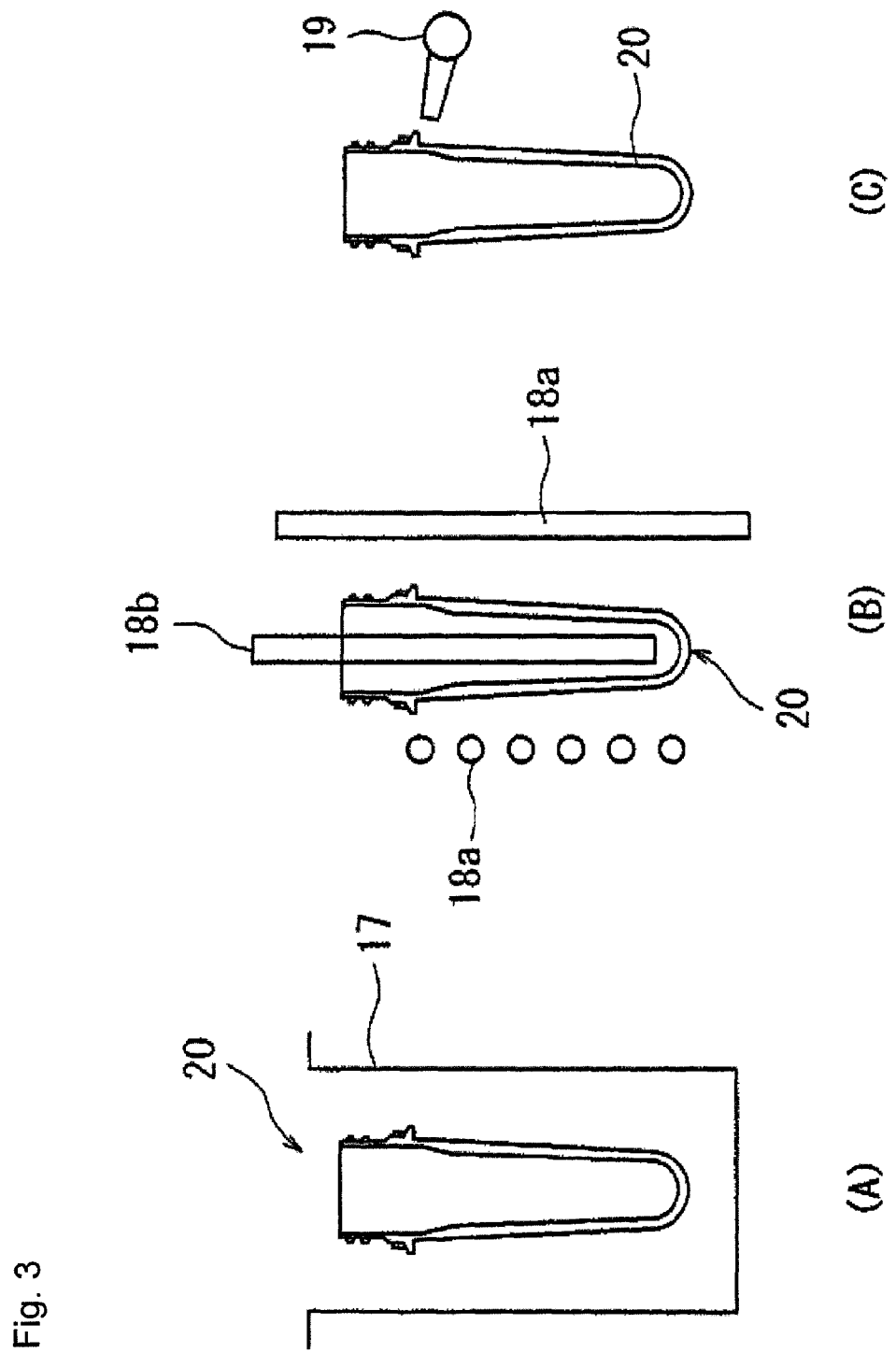
FIG. 3 is a view illustrating a method of heating a preform.

FIG. 3 is a diagram illustrating a method of heating, which comprises three heating steps.

In FIG. 3(A), an equalizer 17 is used as a primary heating (pre-heating) to effect the heating at 65 to 75° C. in advance. This establishes a state where there is almost no temperature difference among the outer surface of the preform 20, the inner surface thereof and the thick central portion thereof. After the preform 20 is thus preheated such that the temperature as a whole is elevated from normal temperature up to 65 to 75° C., the main heating is effected as a secondary heating as shown in FIG. 3(B). By using a heater box 18a of a panel using an infrared-ray heater as a source of heat and an inner surface heater 18b in combination, the preform 20 is heated to lie in the above-mentioned range of stretching temperature at the time of blow-forming, which is slightly higher than the stretching temperature by taking into consideration the cooling during the conveyance. Therefore, the preform is further heated uniformly by the heater box 18a within a short period of time from the state where it has already been heated up to 65 to 75° C. by the pre-heating, minimizing the temperature difference in the direction of thickness and suppressing the dispersion of heating of the preform 20 in the axial direction.

After the main heating, the preform is introduced into a mold for blow-forming as shown in FIG. 3(C) to effect the stretch-blow forming. Just prior to the blow forming, however, a partial heating is effected here as a tertiary heating. The partial heating which is the tertial heating is for stretching a shoulder portion 13 and a portion corresponding to an upper part of the body wall 14 of the finally formed article (biaxially stretched polyester bottle) among the portions to be stretched of the preform 20 at the time of blow forming. These portions are heated by a hot air heater 19 equipped with an infrared-ray heater to a temperature that lies within the above-mentioned range of stretching temperatures to compensate for a cooled amount caused by the conveyance.

Therefore, just before the blow forming or just before being introduced into the mold for blowing, the temperature is the highest at the shoulder portion 13 and at the upper part of the body wall 14 of the finally formed article 10 of the preform 20. Other portions are in a state of being nearly uniformly heated at a slightly lower temperature due to cooling through the conveyance.

It is desired from the standpoint of stretching that the above-mentioned three steps are all executed. Among the three steps of the device shown in FIG. 3, however, the heating may be effected through the step of FIG. 3(B) only. Or, in the step of FIG. 3(B), the heating may be effected by omitting the inner heating device. Or, the heating system may be such that the step of either FIG. 3(A) or FIG. 3(C) is added to before or the after the step of FIG. 3(B).

(Step of Biaxial Stretch-Blow Forming)

Figure 2:
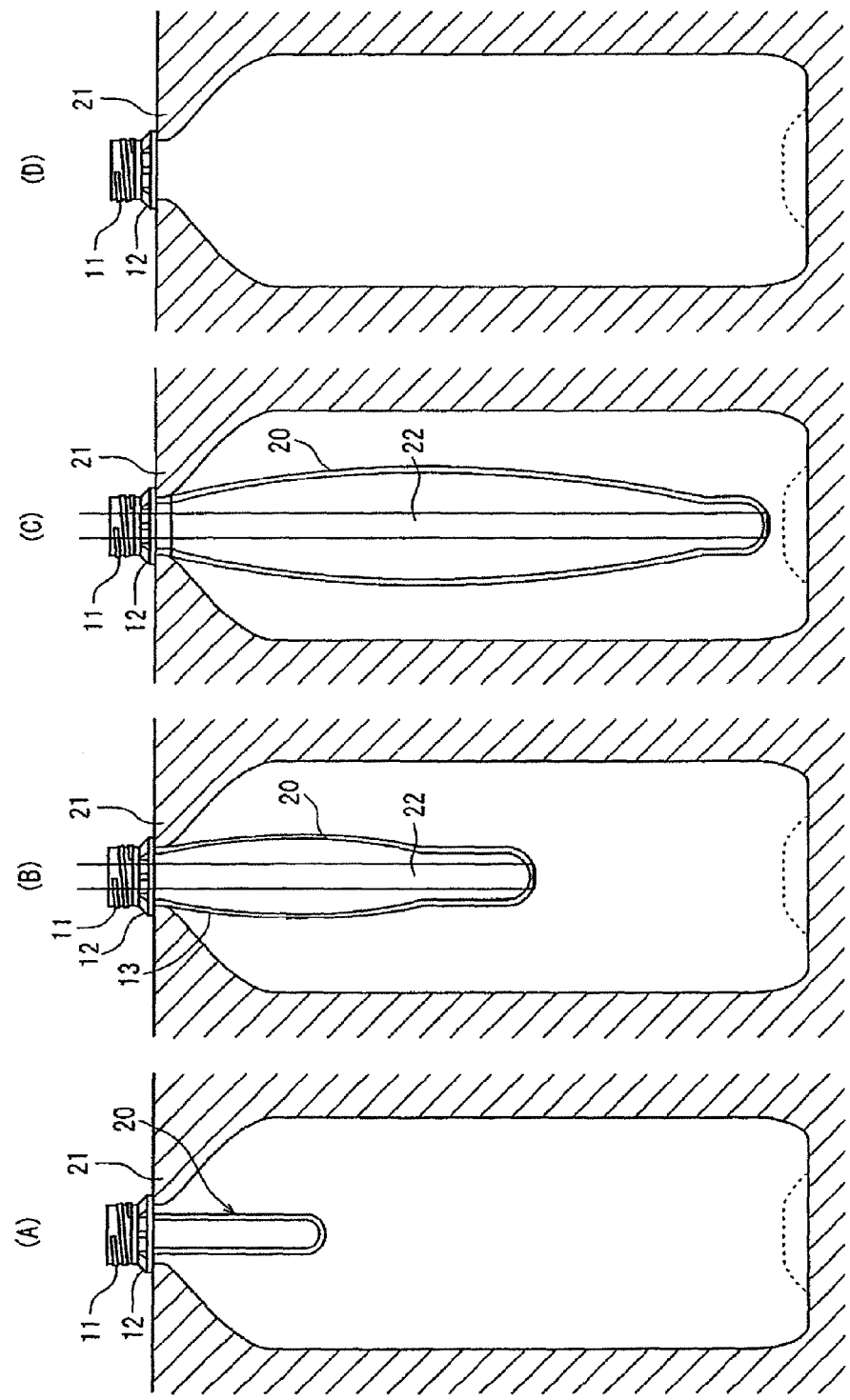
FIG. 2 is a view illustrating a stretch-blow forming of a biaxially stretched polyester bottle of the present invention.

Next, the stretch-blow forming will be roughly described according to the steps shown in FIG. 2.

Referring to FIG. 2(A), the preform 20 which is uniformly heated at a high temperature under the above-mentioned heating conditions is introduced into a mold 21 for blowing with its mouth portion being fixed. Referring next to FIG. 2(B), the preform 20 is stretched in the axial direction (longitudinally) by using the stretch rod 22 while blowing the air into the preform at such a flow rate that the preform does not come in contact with the stretch rod but its end and does not come in contact with the surfaces of the mold, either.

In the embodiment shown in FIG. 2, the stretching is effected until the stretch rod 22 reaches nearly 95% of the distance of from under the neck of the finally formed article 10 up to the grounding surface (FIG. 2(C)). At this moment, the preform that is being formed is not still coming in contact with the surfaces of the mold.

At a moment when the stretching by using the stretch rod is discontinued according to the embodiment of the present invention, the rate of blowing the air is not changed but is maintained the same until the article is finally formed; i.e., the stretching is effected in substantially the circumferential direction, and the preform comes in contact with the surfaces of the mold to impart the shape of the finally formed article (FIG. 2(D)).

According to another embodiment of the present invention, further, the main blow is effected at a moment when the stretching by using the stretch rod is discontinued to blow the air at a rate greater than the above rate, whereby the stretching is effected in substantially the circumferential direction, and the preform comes in contact with the surface of the mold to impart the shape of the finally formed article (FIG. 2(D)).

The bottle after the blow forming is thermally setted and is, then, cooled so as to be finished as a finally formed article. The thermal setting can be effected by a one-mold method in the mold for blowing or can be effected by a two-mold method in a mold for thermal setting separate from the mold for blowing. The thermal setting is usually effected at a temperature in a range of 60 to 180° C.

In the stretching by using the stretch rod 22, a portion corresponding to the shoulder 13 of the finally formed article 10 is stretched and, besides, a portion corresponding to the upper part of the body wall 14 continuous thereto is stretched while the lower portion of the body wall 14 of polyester bottle 10 of preform 20 and the bottom portion 15 remain without almost stretched. As described above, further, the air is blown at a predetermined flow rate while effecting the stretching by using the stretch rod preventing the preform from coming in contact with the stretch rod irrespective of the diameter of the stretch rod.

Figure 4:
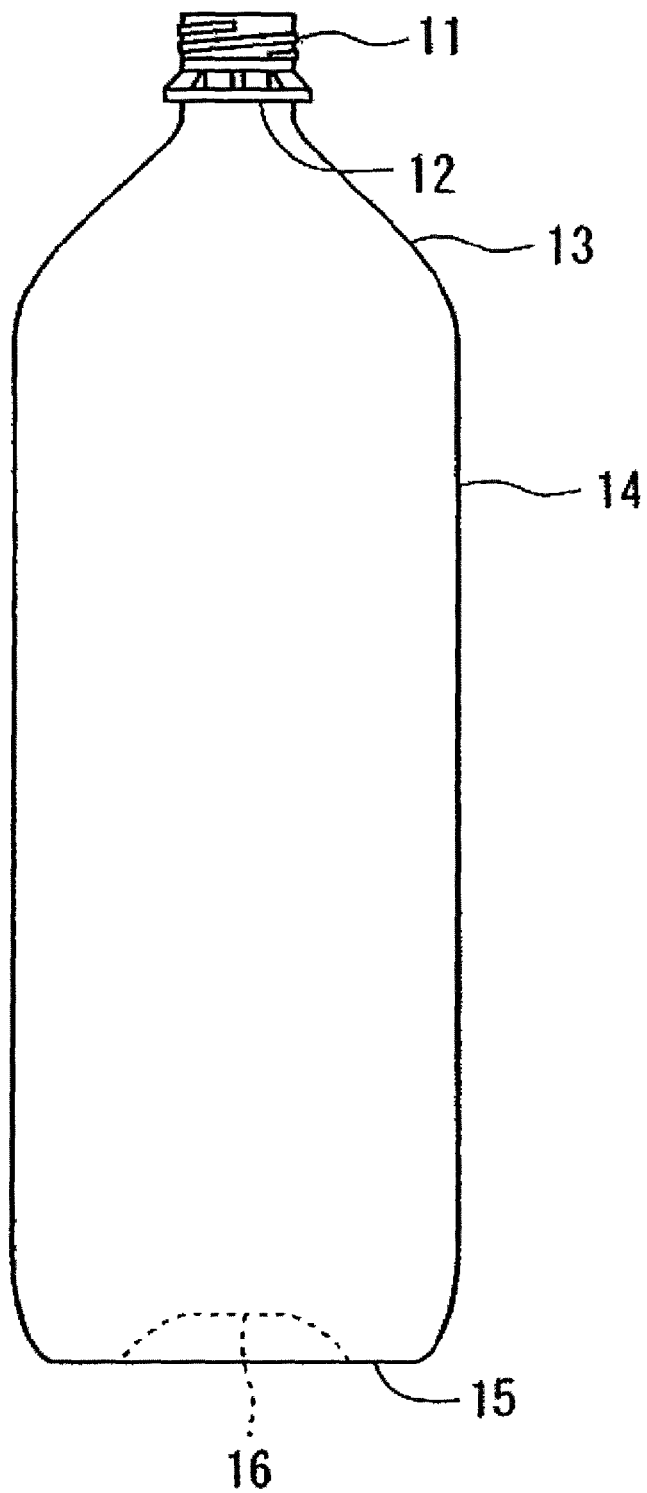
FIG. 4 is a side view illustrating a biaxially stretched polyester bottle of the present invention.

The flow rate with which the preform does not come in contact with the stretch rod but its end and does not come in contact with the surfaces of the mold, varies depending upon the size of the preform, diameter of the stretch rod and the shape of the finally formed article, and cannot be exclusively defined. However, there can be blown the air of a pressure adjusted to be 0.05 to 0.5 MPa. In the case of a 2000-mL biaxially stretched polyester bottle having a final shape which is a circular shape in transverse cross section as shown in FIG. 4, it is desired that the pressure of the air is in a range of 0.05 to 0.1 MPa. By decreasing the rate of blowing the air as described above, it becomes possible to suppress a change in the temperature caused by the adiabatic expansion of the air blown into the preform from an air tank and to carry out the stretch-blow forming at a temperature which is set in the air tank.

It is further desired that the temperature of the air to be blown has been adjusted in the air tank to lie in a range of 60 to 300° C. and, particularly, 100 to 200° C. By adjusting the air to be blown to possess a high temperature as described above, it is allowed to suppress a drop in the temperature of the preform which, therefore, can be stretched more uniformly to possess a thickness that is decreased to a high degree.

In the stretch-blow forming of the present invention as described above, the finally formed article can be obtained without burst even by stretch-blowing the air into the preform at a flow rate with which the preform does not come in contact with the stretch rod but the end thereof and does not come in contact with the surfaces of the mold until the end of the stretch-blow forming. From the standpoint of improving the productivity by shortening the time required for the stretching, however, it is desired to blow the air as a pre-blow at the time of effecting the stretching by using the stretch rod, to discontinue the pre-blow simultaneously with the end of stretching by using the stretch rod and, thereafter, to effect the stretching by the main blow.

In this case, it is desired that the pre-blow at the time of stretching by using the stretch rod is for blowing 10 to 50% and, particularly, 25 to 40% of the volume of the biaxially stretched bottle which is the finally formed article.

It is further desired that the stretch rod stretches the preform in the longitudinal direction to a distance of not smaller than 70% of the distance of from under the neck in the final size of the bottle down to the grounding surface (vertical distance from a support ring 12 to the grounding surface in FIG. 4). When the distance is smaller than 70%, the amount of stretching increases excessively as the air is blown. When the stretching is effected being divided into the pre-blow and the main blow, in particular, there tend to occur over-stretching, poor shaping or burst due to sharp stretching by the main blow.

It needs not be pointed out that the upper limit of stretching in the longitudinal direction by using the stretch rod is smaller than the distance of from under the neck in the final size of the bottle down to the grounding surface from which have been subtracted the thickness at the center of the bottom and the depth of the recessed portion if the center of the bottom has been recessed. In the case of a 2000-mL polyester bottle, in general, it is desired that the above upper limit of stretching is about 95% of the distance of from under the neck in the final size of the bottle down to the grounding surface.

In effecting the stretching by using the stretch rod, it is desired that a maximum speed of the stretch rod is not greater than 500 mm/sec. and, particularly, in a range of 200 to 400 mm/sec. and that the speed of the end of the stretch rod when it comes in contact with the inner surface of the bottom of the preform is not greater than 200 mm/sec. or comes into a temporary halt (speed of 0 mm/sec.).

Upon mildly effecting the stretching by using the stretch rod, the stretching can be uniformly accomplished effectively preventing the occurrence of over-stretching, poor shaping or burst that are caused by sharp stretching.

After the end of the stretching by using the stretch rod, desirably, the main blow uses the air of a pressure adjusted to 0.5 to 4.0 MPa and a temperature adjusted to 60 to 300° C. It is desired that the air has the same temperature as the air used by the pre-blow and the pressure adjusted to be greater than that of the pre-blow from the standpoint of productivity since this permits the stretch-blow forming apparatus to be provided with only one air tank.

In the method of producing the biaxially stretched polyester bottle of the present invention, it is desired that the stretching ratios are such that the longitudinal stretching ratio is not smaller than 2.7 times and the area ratio is 12 to 25 times. In the case of a 2000-mL polyester bottle, it is desired that the volume ratio (volume ratio=volume of the mold/volume of the preform) is 70 to 170 times. This makes it possible to obtain a finally formed article having a decreased thickness and a decreased weight as will be described later.

(Finally Formed Article)

As shown in FIG. 4, the polyester bottle 10 which is the finally formed article obtained by the method of producing the biaxially stretched polyester bottle of the invention includes the unstretched mouth portion 11, support ring 12, stretched shoulder portion 13, body wall 14 and bottom portion 15, and is formed in a shape capable of standing by itself owing to the recessed portion 16 formed in the bottom portion 15.

The polyester bottle 10 has a decreased weight and uses the resin in a decreased amount. The stretched shoulder portion 13, body wall 14 and bottom portion 15 have an average thickness in a range of 0.05 to 0.2 mm and, preferably, 0.07 to 0.11 mm. Therefore, the amount of variation in the thickness is not larger than 0.1 mm and, desirably, not larger than 0.05 mm, and the weight is greatly decreased.

As represented by an embodiment of FIG. 4, the polyester bottle obtained by the production method of the invention does not particularly require reinforcing portions such as reinforcing beads for reinforcing the rigidity and strength to cope with a decrease in the weight and thickness. It is, however, also allowable to form an annular reinforcing rib that is recessed inward at the center of the body wall like in the conventional polyester bottle produced by the method shown in FIG. 1. In this case, there may be used a mold for stretch-blowing having a protuberance formed on the surface of the mold being corresponded to the rib.

EXAMPLES

The invention will be further described by way of the following Examples to which only, however, the invention is in no way limited.

Example 1

A preform having a length of 52 mm and a thickness in the body wall of 3.1 mm (resin amount of 19 g) was heated in a heating device (without inner heating device 18b) shown in FIG. 3(B) for 56 seconds, so that the temperature was 115° C. on the outer surface of the preform and 117° C. on the inner surface thereof.

By using a stretch-blowing apparatus schematically shown in FIG. 2, the thus heated preform was stretched by using a stretch rod at a speed of 200 mm/sec. up to a position of 95% of the distance of from under the support ring down to the grounding surface and, at the same time, the air was blown as a pre-blow, the air being adjusted to possess a temperature of 200° C. and a pressure of 0.07 MPa.

After the end of stretching by using the stretch rod, the air was blown as a main blow, the air being adjusted to possess a temperature of 200° C. and a pressure of 2 MPa to effect such a stretching that a longitudinal stretching ratio was 4.5 times, a transverse stretching ratio was 4.6 times and a volume ratio was 150 times to obtain the shape of the final article. After the end of stretching, the thermal setting was effected at a temperature of 70° C. followed by cooling. There were produced 1000 polyester bottles each having a capacity of 2000 mL.

The number of the bottles that developed any one of whitening due to over-stretching, burst, thermal whitening or ring-like thick portion was 0 (occurrence factor of 0%).

Example 2

A preform having a length of 77 mm and a thickness in the body wall of 2.4 mm (resin amount of 19 g) was heated by the same method as that of Example 1 for 40 seconds, so that the temperature was 105° C. on the outer surface of the preform and 107° C. on the inner surface thereof.

By using the same stretch-blowing apparatus as that of Example 1 and by effecting the pre-blow and the main blow under the same conditions, the thus heated preform was so stretched that a longitudinal stretching ratio was 3.7 times, a transverse stretching ratio was 4.5 times and a volume ratio was 105 times to obtain the shape of the final article. After the end of stretching, the thermal setting was effected at a temperature of 70° C. followed by cooling. There were produced 1000 polyester bottles each having a capacity of 2000 mL.

The number of the bottles that developed any one of whitening due to over-stretching, burst, thermal whitening or ring-like thick portion was 0 (occurrence factor of 0%).

Comparative Example 1

The same preform as the one used in Example 1 was heated in the heating device shown in FIG. 3 for 90 seconds, so that the temperature was 124° C. on the outer surface of the preform and 125° C. on the inner surface thereof.

By using a stretch-blowing apparatus schematically shown in FIG. 1, the thus heated preform was stretched into about 2 times at a speed of 200 mm/sec. After the end of stretching by using the stretch rod, the air was blown as a pre-blow, the air being adjusted to possess a temperature of 200° C. and a pressure of 0.8 MPa.

Next, a main blow was effected by blowing the air adjusted to possess a temperature of 200° C. and a pressure of 3 MPa to effect the stretching to obtain the shape of the final article. After the end of stretching, the thermal setting was effected at a temperature of 70° C. followed by cooling. There were produced 1000 polyester bottles each having a capacity of 2000 mL.

The number of the bottles that developed any one of whitening due to over-stretching, burst, thermal whitening or ring-like thick portion was 450 (occurrence factor of 45%).

INDUSTRIAL APPLICABILITY

According to the method of producing a biaxially stretched polyester bottle, there can be produced a biaxially stretched polyester bottle having an average thickness which is decreased to be about 0.05 to about 0.2 mm using a resin in decreased amounts and having a decreased weight without developing burst or whitening caused by over-stretching, without forming ring-like thick portion yet maintaining a good yield and productivity.

Though not limited thereto only, the thin polyester bottle obtained by the above production method can be favorably used for beverages such as mineral water and the like, contributing to decreasing the cost owing to the use of the resin in decreased amounts. Besides, the thin polyester bottle can be easily crushed offering advantage in easy disposal and economy.

The invention claimed is:

1. A method of producing a biaxially stretched polyester bottle by stretching a polyester preform heated at a stretching temperature by using a stretch rod and by blowing the air, wherein, the temperature for stretching said preform is in a range of 100 to 130° C. on the outer surface of the preform, and a temperature difference between the outer surface of the preform and the inner surface thereof is not larger than 2° C., and in effecting the stretching by using said stretch rod, the air is blown as a pre-blow into the preform at such a flow rate that the preform does not at least come in contact with stretch rod but the end thereof and does not come in contact with the surfaces of the mold, either, the pre-blow air is discontinued simultaneously with the end of the stretching that uses the stretch rod and, thereafter, the stretching is effected by a main blow, said pre-blow for blowing 25 to 40% of the volume of the biaxially stretched bottle blowing the air that has been adjusted to a pressure of 0.05 to 0.1 MPa and a temperature of 200 to 300° C.

2. A method of producing a biaxially stretched polyester bottle according to claim 1, wherein the stretching by said main blow works to stretch, in substantially the circumferential direction, the preform that has been stretched in the longitudinal direction by the stretching by using the stretch rod.

3. A method of producing a biaxially stretched polyester bottle according to claim 1, wherein said pre-blow is for blowing 10 to 50% of the volume of the biaxially stretched bottle.

4. A method of producing a biaxially stretched polyester bottle according to claim 1, wherein said main blow uses the air of a pressure adjusted to 0.5 to 4.0 MPa.

5. A method of producing a biaxially stretched polyester bottle according to claim 1, wherein said main blow uses the air of a temperature adjusted to 70 to 250° C.

6. A method of producing a biaxially stretched polyester bottle according to claim 1, wherein said stretch rod stretches the preform in the vertical direction to not less than 70% of the final size of the bottle.

7. A method of producing a biaxially stretched polyester bottle according to claim 1, wherein in effecting the stretching by using said stretch rod, a maximum speed of the stretch rod is not greater than 500 mm/sec.

8. A method of producing a biaxially stretched polyester bottle according to claim 1, wherein in effecting the stretching by using said stretch rod, the speed of the end of the stretch rod when it comes in contact with the inner surface of the bottom of the preform is not greater than 200 mm/sec.

9. A method of producing a biaxially stretched polyester bottle according to claim 1, wherein the stretching ratios are such that the longitudinal stretching ratio is not smaller than 2.7 times and the area ratio is 12 to 25 times.

* * * * *